Dec. 24, 1957　　　　M. KAPLAN ET AL　　　　2,817,331
FOUR-WAY BROILER STOVE
Filed Feb. 17, 1953　　　　　　　　　　　　　　6 Sheets-Sheet 1
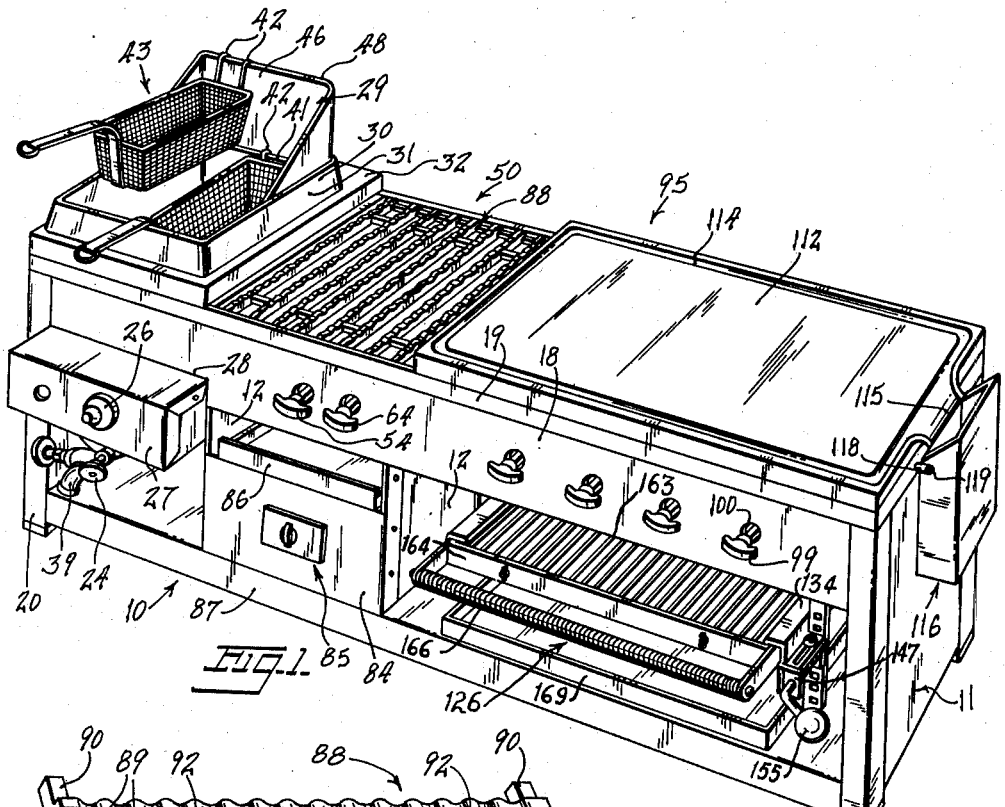
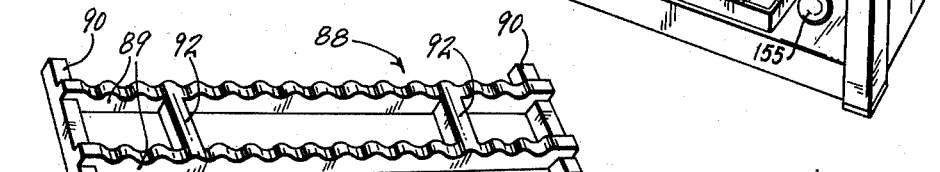
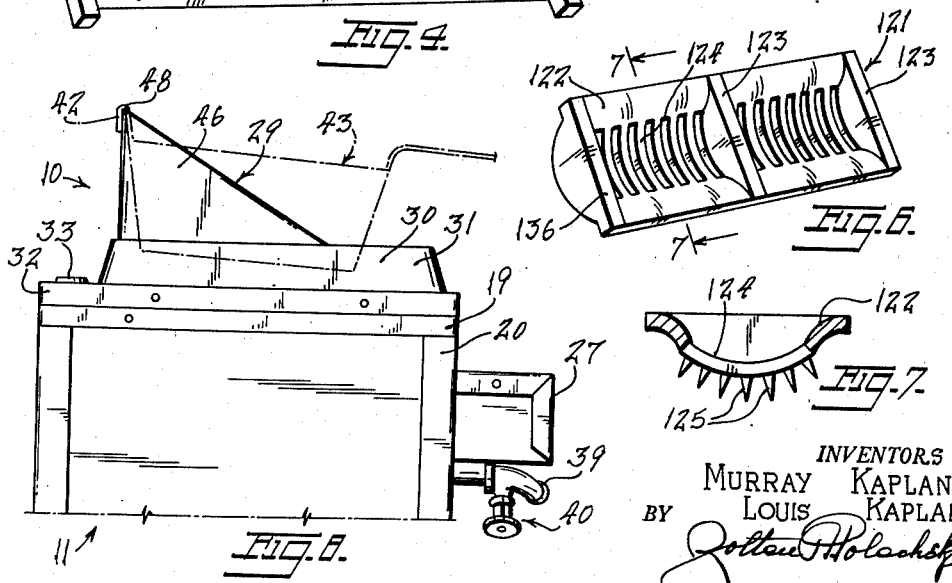
INVENTORS
MURRAY KAPLAN
LOUIS KAPLAN
BY
ATTORNEY

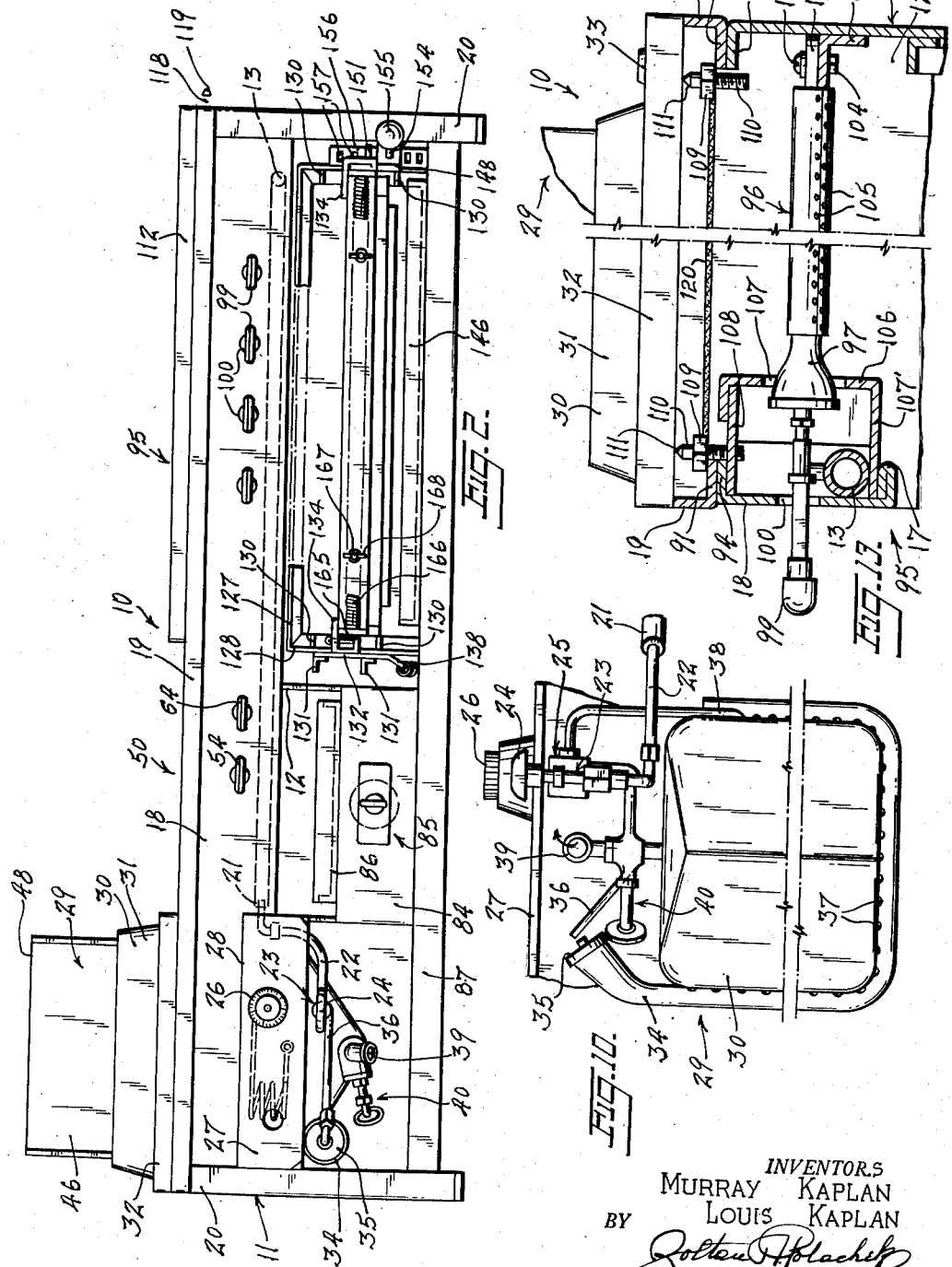

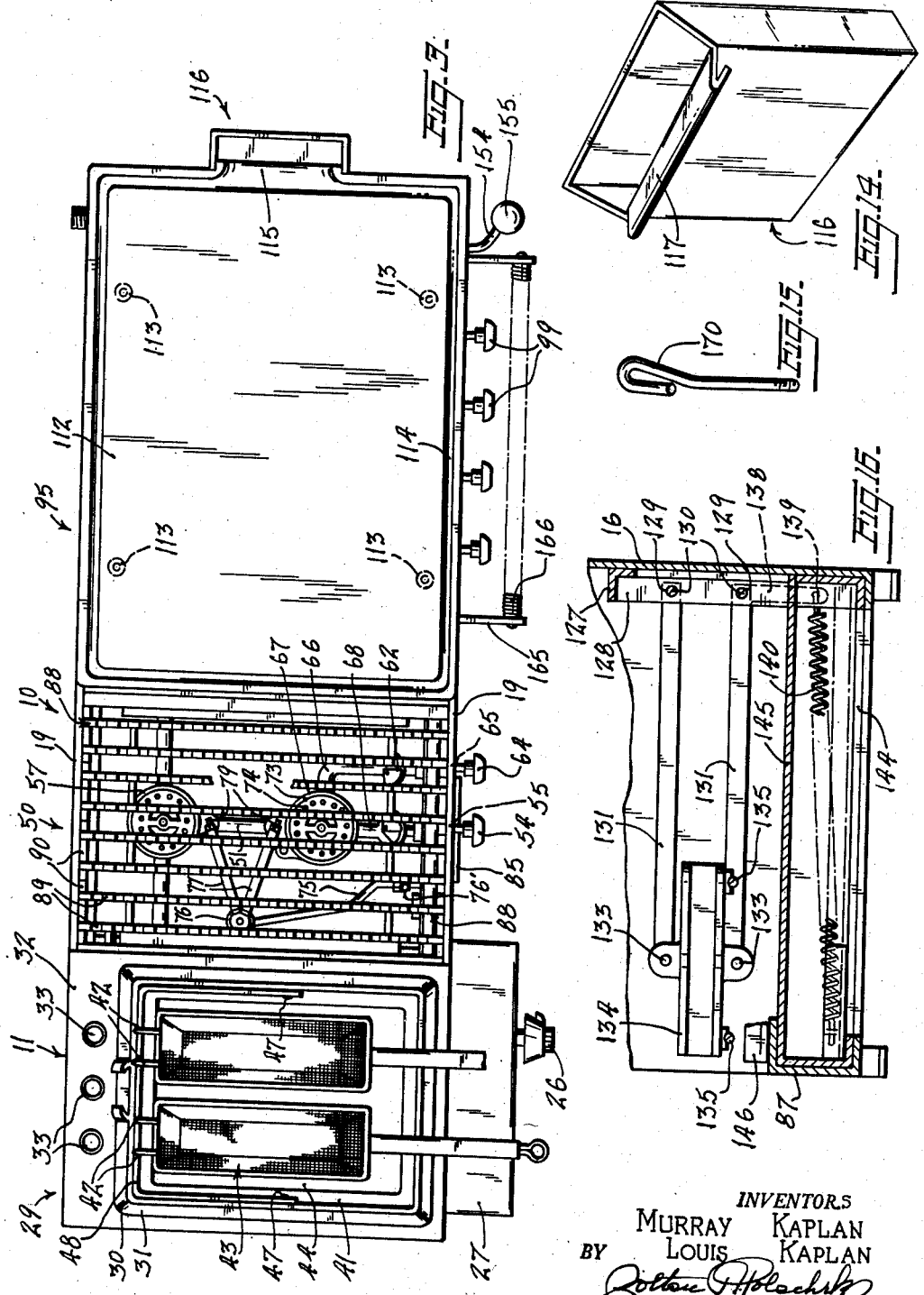

Dec. 24, 1957
M. KAPLAN ET AL
2,817,331
FOUR-WAY BROILER STOVE
Filed Feb. 17, 1953
6 Sheets-Sheet 4
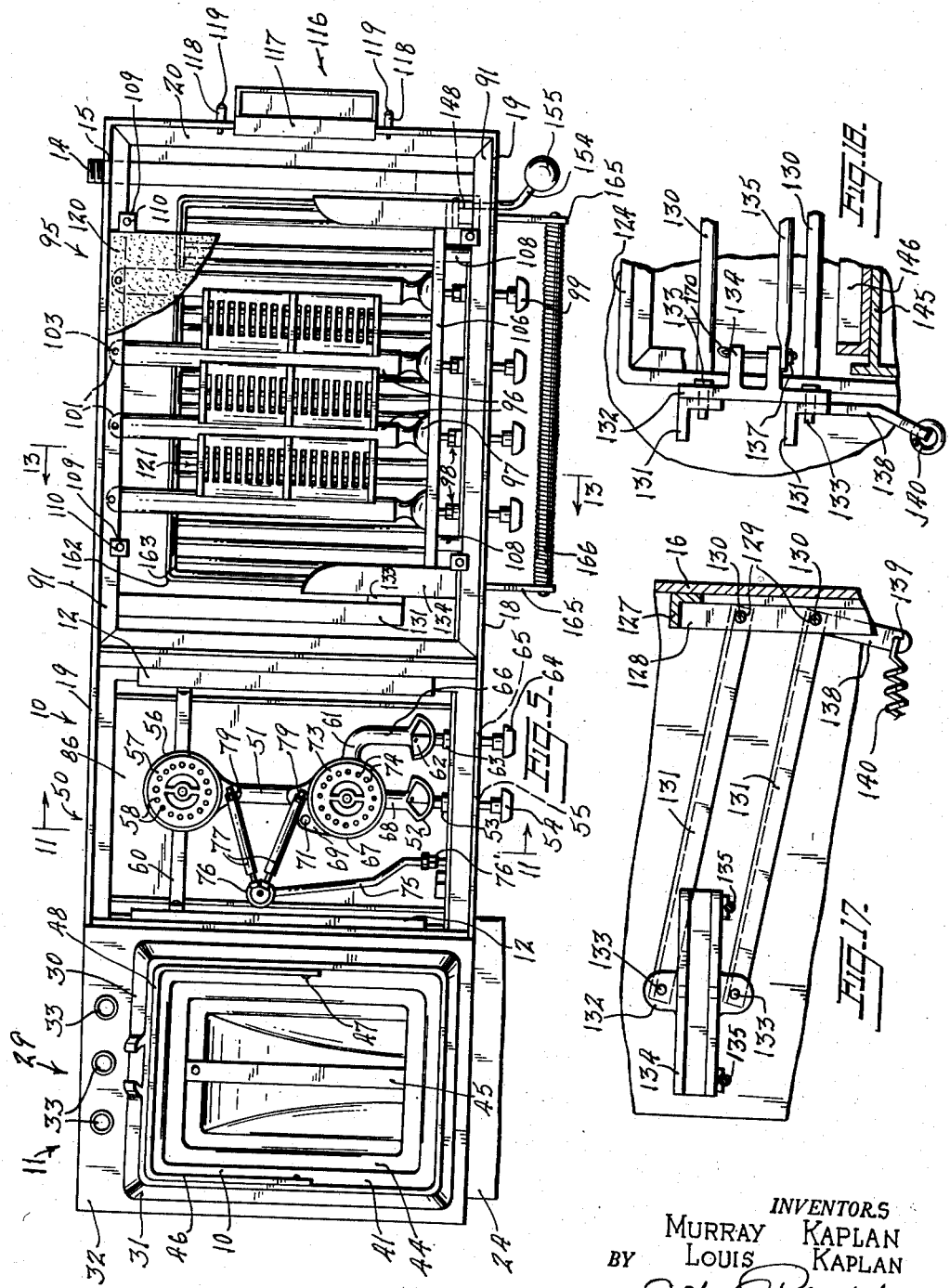
INVENTORS
MURRAY KAPLAN
LOUIS KAPLAN
BY
ATTORNEY Dec. 24, 1957
M. KAPLAN ET AL
2,817,331
FOUR-WAY BROILER STOVE
Filed Feb. 17, 1953
6 Sheets-Sheet 5
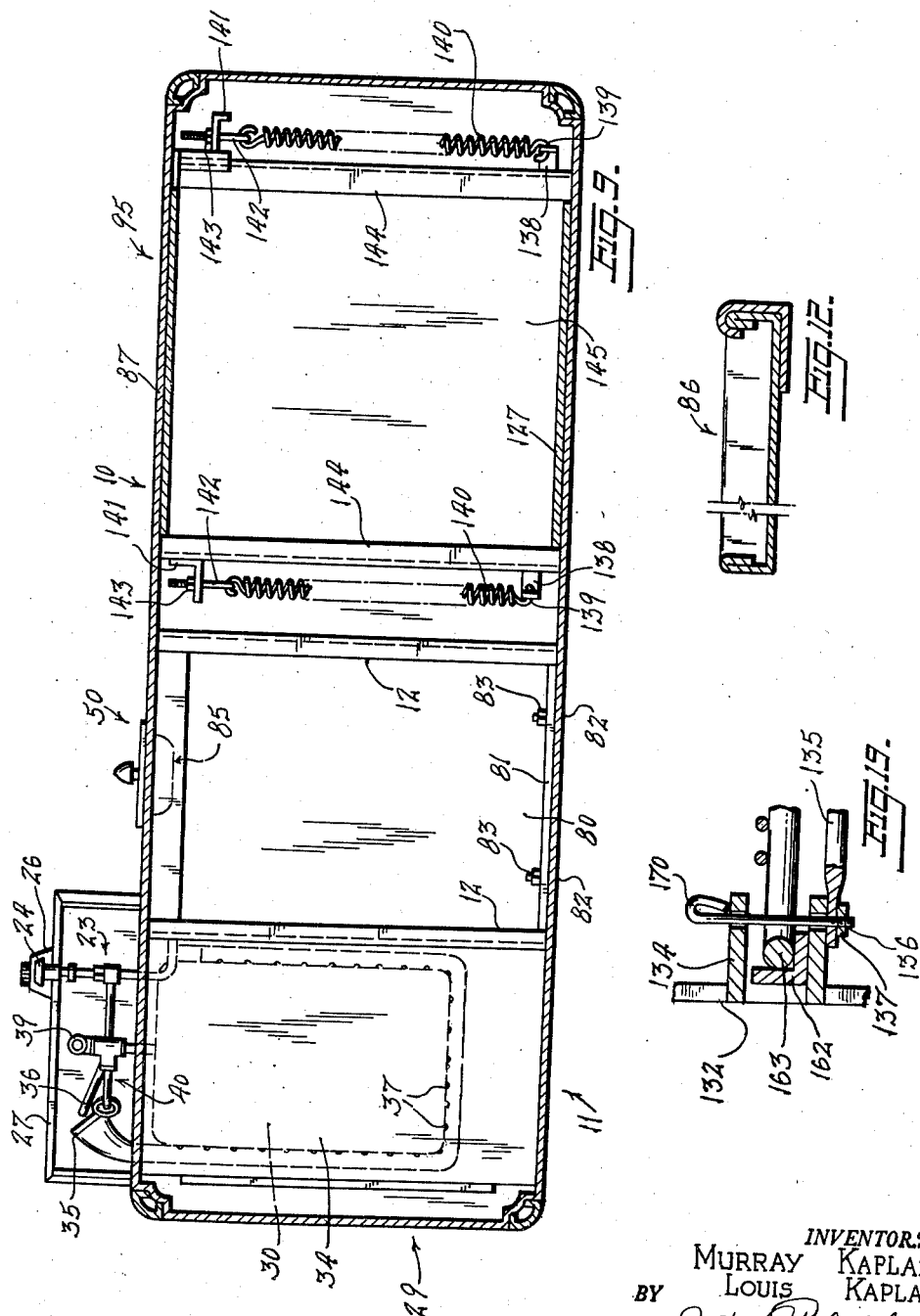
INVENTORS
MURRAY KAPLAN
LOUIS KAPLAN
BY
*ATTORNEY*

Dec. 24, 1957  M. KAPLAN ET AL  2,817,331
FOUR-WAY BROILER STOVE
Filed Feb. 17, 1953  6 Sheets-Sheet 6
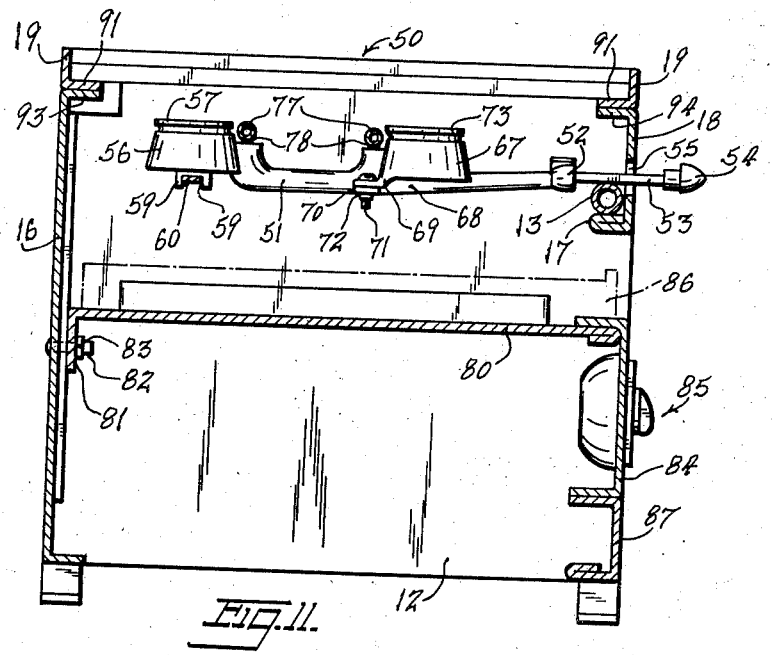
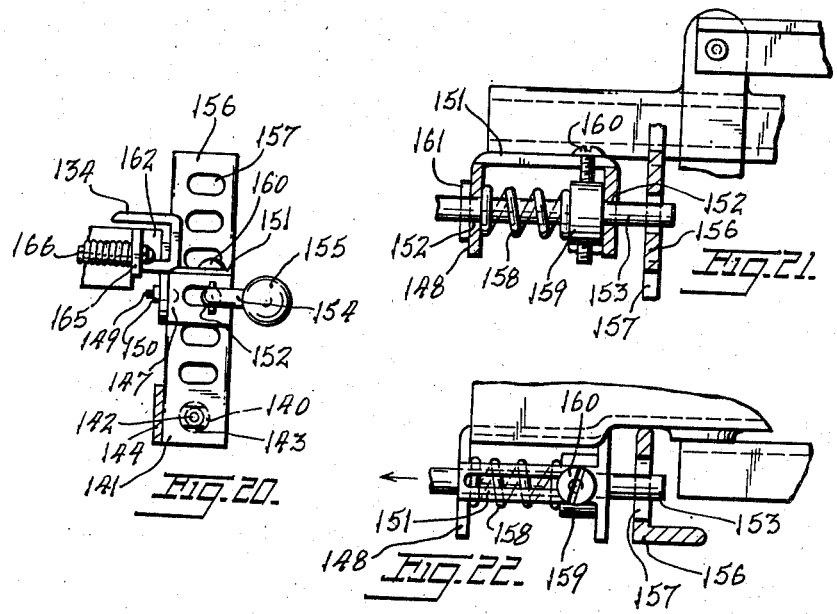
INVENTORS
MURRAY KAPLAN
LOUIS KAPLAN
BY
ATTORNEY

United States Patent Office 2,817,331
Patented Dec. 24, 1957

2,817,331

FOUR-WAY BROILER STOVE

Murray Kaplan and Louis Kaplan, Great Neck, N. Y.

Application February 17, 1953, Serial No. 337,338

2 Claims. (Cl. 126—41)

This invention relates to broilers and, more particularly, to a four-way broiler stove combining a deep fat fryer, a short order stove, a griddle broiler and an inclosed broiler.

It is a principal object of the present invention to provide a four-way broiler stove combining a deep fat fryer, a short order stove, a griddle broiler and an inclosed broiler which is adapted to be used in restaurants or in homes and which provides the above alternate cooking means in a compact unit.

It is another object of the present invention to provide a four-way broiler stove combining a deep fat fryer, a short order stove, a griddle broiler and an inclosed broiler and which provides the above alternate cooking means in readily accessible compartments of the stove.

It is still another object of the present invention to provide a four-way broiler stove combining a deep fat fryer, a short order stove, a griddle broiler and an inclosed broiler which may be used alternately or simultaneously, depending on the requirements of the user.

It is still another object of the present invention to provide a four-way broiler having an inclosed horizontal broiler located below the heating means and which is adjustable vertically towards and away from the heating means providing greater control over the broiling of the meat.

Still other objects of the present invention are to provide a four-way broiler stove which is of simplified construction, inexpensive to manufacture, is compact, of pleasing appearance, is durable, will have long life and is highly efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a four-way broiler stove embodying the features of the present invention.

Fig. 2 is a front elevational view of the stove shown in Fig. 1.

Fig. 3 is a top plan view of the stove shown in Fig. 1.

Fig. 4 is a perspective view of one of the gratings for the short order stove section of the stove shown in Fig. 1.

Fig. 5 is a top plan view of the stove shown in Fig. 1 with the frying baskets, short order stove gratings and griddle broiler cover removed to show the interior thereof.

Fig. 6 is a perspective view of one of the gratings for the griddle broiler section of the stove shown in Fig. 1.

Fig. 7 is a vertical sectional view taken along line 7—7 of Fig. 6.

Fig. 8 is an end elevational view of the stove shown in Fig. 1.

Fig. 9 is a bottom plan view of the stove shown in Fig. 1 shown partly in section to show the construction of the body.

Fig. 10 is a fragmentary bottom plan view of the deep fat fryer section of the stove shown in Fig. 1.

Fig. 11 is a vertical sectional view taken along line 11—11 of Fig. 5.

Fig. 12 is a vertical sectional view of a tray used below the short order stove section of the stove shown in Fig. 1.

Fig. 13 is a fragmentary vertical sectional view taken along line 13—13 of Fig. 5 showing the upper portion of the stove.

Fig. 14 is a perspective view of the container used with the invention.

Fig. 15 is a perspective view of a locking pin used with the invention.

Fig. 16 is a fragmentary vertical sectional view similar to Fig. 13 showing the lower portion of the stove and more particularly part of the means for vertically adjusting the inclosed horizontal broiler.

Fig. 17 is a view similar to Fig. 16 showing part of the means for vertically adjusting the inclosed broiler in a raised position.

Fig. 18 is a fragmentary front elevational view of the part of the means for vertically adjusting the inclosed broiler shown in Figs. 16 and 17.

Fig. 19 is a fragmentary vertical sectional view of the part of the means for vertically adjusting the inclosed broiler shown in Figs. 16-18 and showing the inclosed broiler in operative engagement therewith.

Fig. 20 is a front elevational view of another part of the means for vertically adjusting the inclosed broiler.

Fig. 21 is a fragmentary side elevational view partly in section of the part of the means for vertically adjusting the inclosed broiler shown in Fig. 20.

Fig. 22 is a fragmentary top plan view partly in section of the part of the means for vertically adjusting the inclosed broiler shown in Figs. 20 and 21.

Referring now in detail to the figures, there is shown a four-way broiler stove, referred to collectively as 10, comprising a rectangular cabinet 11, of steel or other suitable material, open at the front and top and divided up into two small compartments and one large compartment by vertical partitions 12.

A horizontal gas pipe 13, having an inlet 14 externally threaded to engage the gas pipe line of a household, and extending inwardly through a hole 15 in the upper rear wall 16 of the cabinet 11 to extend around one inner end and the front thereof, rests upon the inwardly extending flange 17 of the upper front panel 18. The front panel 18 is secured in conventional manner to the top 19 and ends 20 of the cabinet 11, and is secured thereto by clamps.

The outlet end 21 of the gas pipe 13 is connected in conventional manner by means of copper tubing 22 to the usual valve 23 having a manual operable handle 24, the valve 23 being connected in turn to a temperature-regulating valve 25 positioned within the casing 27 and having a manually operable dial 26 extending outwardly therefrom. As shown in Fig. 1, the casing 27, open at the bottom, is positioned in a rectangular opening 28 in the front panel 18 at one end thereof and is secured in conventional manner to one end 20 of the cabinet and the partition 12.

A deep fat fryer, referred to collectively as 29, is located in one of the smaller compartments at one end of the cabinet 11 and includes a deep cast-iron trough 30, the trough 30 having an upper integral rim 31 having outwardly and downwardly inclined outer sides. The rim 31 is supported on a pedestal 32 secured to the top of the cabinet over the deep fat fryer compartment and provided with a rectangular opening whereby to receive and support the trough in spaced relationship to the walls of the cabinet and the partition 12. The upper surface of the pedestal 32 is provided near the rear edge with three openings 33 permitting access to the interior of the compartment surrounding the trough.

A U-shaped gas burner 34 surrounds the bottom of the trough 30 and is secured thereto intermediate its ends in conventional manner. The inlet 35 of the burner 34 is connected to the temperature-regulating valve 25 by means of copper tubing 36, as shown in Fig. 10, and is provided with a plurality of outlets 37 surrounding the base of the trough 30. A pilot-light tube 38 is connected to the valve 25 at one end and extends around one end of the burner 34 to normally provide at its other end a pilot light adjacent one of the outlets 37. An outlet 39 communicates with the interior of the trough 30 and is provided with manually operable valve 40 of conventional type.

The inner wall of the rim 31 is provided with a shoulder 41 at the base periphery thereof adapted to engage the hooks 42 of wire baskets 43, the body portions of the baskets being adapted to fit with the trough 30 as shown in Fig. 1. The inner vertical walls of the trough 30 taper inwardly as at 44 toward the bottom thereof, a bar 45 secured within the trough normally preventing the bottoms of the wire baskets 43 from accidentally coming into contact with the deeper recesses of the trough bottom, as shown in Fig. 5. A three-sided shield 46 is secured at its ends to the inner wall of the rim 31 above the shoulder 41 by means of screws 47, the upper edge 48 of the central side of the shield providing a convenient support for the hooks 42 when it is desired to maintain the baskets 43 above the trough 30 and out of engagement with the contents thereof.

Once the inlet 14 has been connected to a household gas pipe line, the handle 24 of the valve 23 is turned in a counterclockwise direction to supply gas to the temperature-regulating valve 25 and to the pilot-light tube 38. The dial 26 is then rotated to the desired temperature indication thereon, supplying a corresponding amount of gas to the burner 34, a constant temperature being maintained in the trough by thermocouple means 49 in operative engagement with the valve 25 in a well known manner. The trough 30 is provided with the usual bath of molten fat for deep frying of potatoes or the like contained in the baskets 43.

A short order stove, referred to collectively as 50, is located in another of the smaller compartments adjacent the deep fat fryer 29 and includes a horizontal burner 51 connected at its inlet 52 to a valve 53 having a manually operable handle 54 extending outwardly of the front panel 18 through a hole 55, the valve 53 being operatively connected to the gas pipe 13 in conventional manner. The outlet 56 of the burner 51 is provided with the usual circular cover 57 having a plurality of outlets 58, the undersurface of the outlet 56 having integrally formed therein at each side a pair of ears 59 adapted to engage a cross bar 60 secured at its ends to the partitions 12 in conventional manner whereby to support the burner 51 at its outlet end. A second horizontal burner 61 is connected at its inlet 62 to a valve 63 having a manually operable handle 64 extending outwardly of the front panel 18 through a hole 65 and has a curved arm 66 permitting its outlet 67 to rest on the arm 68 of the burner 51, the outlet 67 having at its base an integrally formed flange 69 connected to a bracket 70 integrally formed in the arm 68 by means of a screw 71 and nut 72. The outlet 67 is provided with the usual cover 73 having a plurality of outlets 74.

The usual pilot-light tube 75 is connected in conventional manner to the gas pipe 13 as at 76' and is provided at its outlet end with the usual cylindrical cup 76 having around its periphery a plurality of holes receiving one end of telescoped arms 77 which extend to the outlets 56 and 73 to engage openings 78 provided at their bases, gas from the pipe 13 passing into the cup 76 and thence through the arms 77 to provide pilot lights adjacent the openings 78 as at 79.

A floor 80 is secured to rear wall 16 along a flange 81 by means of screws 82 and nuts 83, as shown in Fig. 11, and connects with a lower front panel 84 provided at its center with a timer 85. The lower front panel 84 rests upon the bottom 87 of the cabinet 11 and is secured thereto in conventional manner. A tray 86 is adapted to slide in and out on the floor 80 below the short order stove 50.

A plurality of gratings 88 each consisting of a pair of parallel arms 89 corrugated along their upper edges and having cross bars 90 integrally formed at their ends are positioned above the burners 51 and 61 as shown in Fig. 3. The ends 90 rest on inwardly extending flanges 91 of the tops 19 of the cabinet whereby to support the arms 89 which are further provided with cross bars 92 intermediate their ends for greater strength. As shown in Fig. 11, the flanges 91 of the tops 19 in turn rest upon and are secured to, in conventional manner, inwardly extending flanges 93 and 94 of the rear wall 16 and front panel 18 respectively.

To operate the short order stove 50, the handles 54 and 64 are turned on, with the pilot lights at 79 igniting the burners 51 and 61, and the meat or the like resting on the corrugated upper edges of the gratings 88.

A griddle broiler, referred to collectively as 95, is located in the large compartment at the other end of the cabinet 11 and includes four parallel burners 96 connected at their inlets 97 to valves 98 having manually operable handles 99 extending outwardly of the front panel 18 through holes 100, the valves 98 being operatively connected to the gas pipe 13 in a well known manner.

The rear ends of the burners 96 are provided with integrally formed flanges 101 supported by an L-shaped member 102, the flanges 101 and the member 102 having aligned holes receiving screws 103 and nuts 104. The L-shaped member 102 is secured in conventional manner to the rear wall 16 of the cabinet 11 and serves to support the rear ends of the burners 96. The undersides of the burners 96 are provided with the usual plurality of outlets 105. A guard 106 having a plurality of openings 107 adapted to receive the inlets 97 is secured in conventional manner at its lower side 107' to the inwardly extending flange 17 of the front panel 18 and at its top to the inwardly extending flanges 91 and 94 of the top 19 and front panel 18 respectively by means of cross braces 108, the cross braces being soldered to the top of the guard 106 at one end and secured to the flanges 91 and 94 at its other end by conventional means.

The longitudinal, inwardly extending flanges 91 of the tops 19 at front and rear are provided with nuts 109 soldered thereto and adapted to receive headless bolts 110 internally threaded so as to be adjustable vertically in the nuts 109, the upper ends of the headless bolts 110 being conical in shape and having points 111. A griddle 112 is provided on its undersurface with integrally formed sockets 113 adapted to receive the points 111 whereby to support the griddle 112 in a position adjustable vertically by the bolts 110. The bolts 110 on one side of the griddle may be higher than the ones on the other side of the griddle so as to tilt the griddle toward one end for a purpose to be hereinafter described. The upper surface of the griddle 112 is provided with an annular gutter 114 communicating with a lip 115 at one side. A container 116 having an inwardly and downwardly bent flange 117 adapted to engage the top 19 is located adjacent the lip 115, with the flange 117 underlying the lip 115 as shown in Fig. 3. A pair of outwardly extending cylindrical members 118 are secured to the top 19 by means of screws 119 and are positioned at either side of the container 116 to prevent its displacement along the upper edge of the top 19. An asbestos board 120 rests on the inwardly extending flanges 91 at the front and rear of the cabinet intermediate the griddle 112 and the burners 96.

Three heat refractory gratings 121 each consisting of a pair of longitudinal parallel arms 122 connected at their ends and middle by integrally formed cross braces 123 and by a plurality of secondary braces 124 having downwardly extending needles 125 are positioned above the burners 96 as shown in Fig. 5. The outer sides of the arms 122 are concavely curved so as to rest on adjacent cylindrical burners 96 with one end 123 resting on the inwardly extending flange 91 intermediate the flanges 101. The needles 125 serve to direct the heat downwardly from the burners 96 for a purpose to be hereinafter described.

In operation, any grease collecting on the upper surface of the griddle 112 will collect in the annular gutter 114. By means of the vertically adjustable bolts 110, the griddle 112 may be tilted toward the container 116, with the grease collecting in the annular gutter 114 running to the lip 115 and into the container 116.

An inclosed broiler, referred to collectively as 126, is positioned within the cabinet 11 below the burners 96 in a manner to be hereinafter described.

A rectangular frame 127, L-shaped in cross section, is secured to the rear wall 16 in conventional manner and extends from below the burners 96 to the bottom of the wall, the vertical members of the frame 127 presenting inwardly extending flanges 128. The flanges 128 are each provided with a pair of vertically spaced, aligned holes 129 which serve as bearings for the horizontal cylindrical shafts 130.

Rigidly secured to the ends of the shafts 130 external and adjacent to the flanges 128 are two pair of parallel arms 131 of L-shaped cross section, the forward ends of the parallel arms 131 being pivotally connected to a pair of brackets 132 by means of cylindrical shafts 133 located in aligned holes in the brackets 132 and arms 131. Integrally formed on the inner faces of each of the brackets 132 is three-sided rectangular member 134, the longitudinal axis of the members 134 being perpendicular to the axis of the brackets and with the open sides facing inward so as to provide a pair of aligned rectangular recesses for a purpose to be hereinafter described.

A pair of horizontal cylindrical shafts 135 are secured at their ends to the bottoms of the brackets 132 by means of screws and nuts 137 located in aligned holes in the shaft ends and in the brackets.

A pair of outwardly bent arms 138 are rigidly secured to the lower pair of parallel arms 131 at their rear ends external and adjacent to the flanges 128 and at right angles to the arms 131 as shown in Figs. 16, 17 and 18. The lower ends of the arms 138 are provided with holes 139 receiving a pair of heavy horizontal helical springs 140 extending from front to rear and secured to brackets 141 at the front by means of screws 142 and nuts 143 as shown in Fig. 9. The brackets 141 are secured in conventional manner to the cross braces 144 connecting the front bottom 87 with the base of the frame 127 and the rear wall 16. A floor 145 extends from front to rear between the flanges 128 and is rigidly secured to the underside of the front bottom 87, and is adapted to support a tray 146.

Referring now particularly to Figs. 20-22, the endmost rectangular member 134 is provided on the face adjacent the bracket 132 with an integrally formed, downwardly extending flange 147 coinciding with a three-sided rectangular member 148 and secured to the middle side thereof by means of screws 149 and nuts 150. The ends of the member 148 are reinforced across the top by integral parallel braces 151, and are provided with aligned holes 152 receiving a shaft 153 having an outwardly bent handle 154 to which is attached a manually operable knob 155 and which extends outwardly from the front of the cabinet. An upstanding integral extension 156 of the endmost bracket 141 is provided with a plurality of vertically spaced openings 157 adapted to receive the innermost end of the shaft 153 in a variety of vertical positions, as clearly shown in Fig. 20. A helical spring 158 surrounds the shaft 153 within the three-sided member 148, one end of the spring engaging the inner side of the member 148 and the other end tensionally engaging the sides of a cylindrical sleeve 159 rigidly secured to the shaft 153 by means of a screw 160 whereby to normally urge the shaft 153 into operative engagement with the holes 157 in the upstanding extension 156 and to lock the member 148 in a particular vertical setting. The screw 160 extends upwardly between the braces 151 and is accessible to adjust the sleeve 159 longitudinally along the shaft 153 to thereby adjust the tension of the spring 158 to the most convenient setting for the user. The inner movement of the shaft 153 is limited by a pin 161 piercing the shaft 153 external and adjacent the member 148.

In operation, the knob 155 is pulled outwardly to disengage the shaft 153 from the openings 157 in the upstanding extension 156 and to permit rotation of the arms 131 about the shafts 133 in an upward or downward direction, thereby raising or lowering the brackets 134 which are constantly maintained horizontal due to the pivotal joints 133. When the desired vertical adjustment of the brackets 134 has been achieved, the knob 155 is released permitting the shaft to enter the appropriate opening 157 and to thereby lock the entire assembly.

A broiler comprising a rectangular frame 162 adapted to receive the usual grill 163 is adapted to slide horizontally into the aligned recesses of the members 134 to a position within the cabinet and below the burners 96. The front of the frame 162 is provided with a bracket 164 having outwardly extending ends 165 having aligned openings adapted to receive a handle 166. Removably secured to the outer face of the front of the frame 162 by means of screws 167 and manually operable nuts 168 is a tray 169 extending downwardly therefrom and under the frame 162 and grill 163. As shown in Fig. 19, the frame 162 and grill 163 are locked in position in the recesses of the members 134 by means of pins 170 passing through the frame and grill and positioned in aligned holes located in the top and bottom of each member 134, at either side of the tray 169.

When the burners 96 are in operation, the heat will be downwardly deflected by the heat refractory gratings 121 and the needles 125 thereof, to the grill 163 containing meat or the like to broiled. The absestos board 120 will further insulate the burners 96 and tend to concentrate the heat from the burners downwardly to the grill 163.

As mentioned above, the brackets 134 may be readily raised or lowered to various vertical positions thereby increasing or decreasing the distance between the burners 96 and the frame 162 and grill 163 and the contents thereof, when it is desired to broil the meat or the like at a particular rate. The horizontal springs 140 will counteract the weight of the meat and the broiler when it is desired to raise the broiler to a closer position to the burners. Grease and fat will be retained on the tray 169 or upon the tray 146.

It should now be apparent that there has been provided a four-way broiler stove combining a deep fat fryer, a short order stove, a griddle broiler and an inclosed broiler which is adapted to be used in homes or restaurants and which provides the above alternate cooking means in a compact unit in readily accessible compartments and which may be used alternately or simultaneously, depending upon the requirements of the user. It should also be apparent that there has been provided an inclosed broiler located below the heating means which is adjustable vertically towards and away from the heating means in a ready and novel manner thus providing greater control over the broiling of the meat and which includes spring means for counteracting the weight of the broiler and contents thereof. It should also be apparent that there has been provided a griddle broiler which includes novel means for collecting and disposing of fat and grease accumulating thereon and which is heated by the same means as the inclosed broiler.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In a broiler stove, a substantially rectangular cabinet, said cabinet being open at the front and top, and having a compartment, an inclosed broiler located within said compartment, heating means for said inclosed broiler being located within said compartment, means for raising and lowering said inclosed broiler to a variety of vertical positions, said raising and lowering means being located within said compartment below said inclosed broiler, means for locking said raising means in a variety of vertical positions of said inclosed broiler, and gas supplying means providing gas to said heating means, said means for lowering and raising said inclosed broiler comprising a pair of double arms located within said compartment below said heating means and at each end thereof including a pair of three-sided substantially rectangular members, means for rotatably mounting the rear ends of said double arms including inwardly extending flanges adjacent the rear ends of said double arms, and spring means for normally maintaining the front ends of said double arms in a raised position comprising a pair of outwardly bent arms rgidly secured to the lowermost of said double arms at their rear ends external to and adjacent said inwardly extending flanges and at substantially right angles to said double arms, the lower ends of said outwardly bent arms each having a hole, a pair of heavy helical springs extending from front to rear of said cabinet at the base of said large compartment, the rear ends of said springs being secured to said lower ends within said holes, a pair of brackets rigidly secured to the front of said cabinet at the base of said large compartment, each of said brackets having a threaded hole, a pair of threaded eye-screws in operative engagement with said threaded holes, the front ends of said springs being secured to the eyes of said eye-screws.

2. In a broiler stove having a cabinet with a vertically movable enclosed broiler therein, mechanism for vertically moving and locking said broiler in a variety of vertical positions, said moving means including a pair of three-sided substantially rectangular members adapted to support the broiler, said means for locking said moving means comprising a downwardly extending flange rigidly secured to one of said three-sided members, another three-sided substantially rectangular member, the middle side of said latter three-sided member being rigidly secured to said flange, the outer sides of said latter member having aligned holes, a substantially cylindrical movable shaft located within said aligned holes, an upstanding member rigidly secured to the base of the cabinet adjacent the innermost outer side of said latter member, said upstanding member having a plurality of vertically spaced openings adapted to receive the inner end of said shaft, spring means for normally urging said shaft into engagement with said openings, means for limiting the inward movement of said shaft into said openings, and manually operable means for extracting said shaft from said openings whereby to permit vertical movement of said enclosed broiler, said means for limiting the inward movement of said shaft into said openings comprising a pin, said pin piercing said shaft external to and adjacent to said last mentioned three-sided member, said manually operable means for extracting said shaft from said openings comprising an outwardly bent handle rigidly secured to said shaft, and a knob rigidly secured to the outer end of said handle.

References Cited in the file of this patent

UNITED STATES PATENTS

| | | |
|---|---|---|
| 191,809 | Moseley | June 12, 1877 |
| 1,010,026 | Cronwall | Nov. 28, 1911 |
| 1,181,722 | Ball | May 2, 1916 |
| 1,333,092 | Peterson | Mar. 9, 1920 |
| 1,340,615 | Lawa | May 18, 1920 |
| 1,475,466 | Wilkinson | Nov. 27, 1923 |
| 1,596,973 | Hollman | Aug. 24, 1926 |
| 1,748,742 | Thomson | Feb. 25, 1930 |
| 1,923,639 | O'Dowd | Aug. 22, 1933 |
| 2,011,848 | Chambers | Aug. 20, 1935 |
| 2,029,449 | Teller | Feb. 4, 1936 |
| 2,044,154 | Coulston | June 16, 1936 |
| 2,128,298 | Janders | Aug. 30, 1938 |
| 2,156,216 | Russell | Apr. 25, 1939 |
| 2,233,463 | Wilson | Mar. 4, 1941 |
| 2,331,707 | Lotter | Oct. 12, 1943 |
| 2,348,720 | Bobo | May 16, 1944 |
| 2,362,757 | Lang | Nov. 14, 1944 |
| 2,433,134 | Long | Dec. 23, 1947 |
| 2,508,974 | Soditch | May 23, 1950 |
| 2,541,528 | McAvoy | Feb. 13, 1951 |
| 2,664,878 | Durant | Jan. 5, 1954 |
| 2,668,527 | Chambers | Feb. 9, 1954 |